United States Patent [19]

Camelon et al.

[11] 3,932,320

[45] Jan. 13, 1976

[54] POWDER PAINTS CONTAINING PARTICULATE METAL II

[75] Inventors: Melville J. Camelon, Utica; Rodney C. Gibeau, Mount Clemens, both of Mich.

[73] Assignee: Ford Motor Company, Dearborn, Mich.

[22] Filed: Sept. 16, 1974

[21] Appl. No.: 506,490

Related U.S. Application Data

[63] Continuation-in-part of Ser. No. 422,471, Dec. 6, 1973, abandoned.

[52] U.S. Cl. ........... 260/17 R; 260/40 R; 260/42.14; 260/42.16; 260/42.22; 260/42.26; 260/42.27; 260/42.28; 260/42.29; 260/42.55; 260/836; 260/837 R; 260/856; 260/857 UN; 260/862; 260/898; 260/897 B; 260/901; 427/195
[51] Int. Cl.².... C08K 3/08; C08K 9/04; C08K 9/10
[58] Field of Search ...... 260/42.14, 42.22; 106/290, 106/291, 40 R, 17 R, 42.16

[56] References Cited
UNITED STATES PATENTS

| | | | |
|---|---|---|---|
| 3,167,525 | 1/1965 | Thomas | 260/41 |
| 3,185,589 | 5/1965 | Damm | 260/42.14 |
| 3,357,900 | 4/1971 | Ponyik | 260/21 |
| 3,532,530 | 10/1970 | Denison et al. | 117/17 |
| 3,532,662 | 10/1970 | Ansdell | 260/34.2 |
| 3,692,731 | 9/1972 | McAdow | 260/32.8 R |
| 3,730,930 | 5/1973 | Labana | 260/23 ED |
| 3,781,379 | 12/1973 | Theodore | 260/836 |

*Primary Examiner*—James H. Derrington
*Attorney, Agent, or Firm*—Olin B. Johnson; Keith L. Zerschling

[57] ABSTRACT

Metal particles used as a color producing component in powder coating compositions are individually encapsulated in a thin and continuous coating of thermoplastic, organic film-former prior to mixing with the particulate, organic, material which serves as the principal film-former of the powder coating composition. The coated particles are prepared by spray drying a solution of a controlled amount of the thermoplastic material in a volatile solvent in which the metal has been dispersed. In a preferred embodiment, the coating thus achieved on the metal particles is of the same composition as the principal film-former of the powder coating composition.

11 Claims, No Drawings

POWDER PAINTS CONTAINING PARTICULATE METAL II

RELATION TO PARENT APPLICATION

This application is a Continuation-In-Part of copending U.S. patent application Ser. No. 422,471 filed Dec. 6, 1973 under the same title and now abandoned.

This application contains the illustrative examples of the parent application and additional illustrative examples wherein the amounts of thermoplastic film-forming material deposited on the metal particles prior to their incorporation into a powder paint are above that illustrated in the parent. The recitational disclosures as to the same in the body of the specification are conformed to take into account the additional examples.

BACKGROUND OF THE INVENTION

One basic technique for the manufacture of powder coating materials is the so-called fusion method. This involves the mixing of solvent-free raw materials in their molten state, usually via some form of extruder, cooling, pulverization and size separation-classification. This method has a number of disadvantages unrelated to pigmentation and an additional short-coming when metal flakes are employed as pigments. The high shear employed in the mixing stage results in deformation of the metal flakes. Additionally, during the pulverization step, the metal flakes are further deformed and reduced in particle size. Coatings produced from such powders are characterized by a low level of brilliance and poor polychromatic appearance.

Another basic technique for the manufacture of powder coating materials is the so-called solution-preparation, solvent-separation technique which can be effected by more than one method. This general technique involves the preparation of a coating material in an organic solvent, separation of the solvent from the paint solids, and size-separation classification. Also, pulverization in some form may or may not be required depending upon the solvent separation method involved.

The separation of the solvent can be carried out by conventional spray drying techniques or by heat exchange separation wherein the components of a paint solution are separated by volatilization of the more volatile solvent and separation of the volatilized solvent from the non-volatilized paint solids by gravitational forces. Since the metal flakes can be added after pulverization, if pulverization is required, when using any of the solvent separation methods, damage to the metal flakes during pulverization can be avoided by using the solution-preparation, solvent-separation technique. Problems do arise, however, with respect to distribution and orientation of the metal flakes when the powder coating material is applied to the substrate to be coated. This is particularly true when the method of application is that of electrostatic spray, the method most commonly employed to apply the final coating of paint to automobiles and a variety of other metal manufacturers. In such applications, the flakes tend to orient in a random fashion with a low percentage of the flakes parallel to the substrate. The net result is a high degree of metal protusion with little metallic brilliance and a low gloss factor.

Thus, when either of the aforedescribed methods are used to produce metal-pigmented, powder-paint coatings in accordance with the prior art processes, a substantially higher aluminum to non-metal pigment ratio is required, relative to the same ratio in liquid paints, in order to achieve the same degree of brightness and metallic appearance obtained with liquid paints. Further, the problem of metal flake protusion remains even when brightness and metallic appearance are achieved.

In liquid paints, it is known to partially coat aluminum flakes used as pigments to increase the electrostatic spray efficiency of such paints. In U.S. Pat. No. 3,575,900, a method is disclosed for precipitating the resin of the solution coating upon the aluminum flake in colloidal form. This solution is then used as such or mixed with another solution for use. The patentee specifically points out that, while it may be convenient to call this encapsulation, it is not intended to devote that the aluminum particles are completely enveloped. The resin disclosed for this purpose is a copolymer of vinyl chloride and monoethylenically unsaturated monomers containing about 60 to about 90 percent by weight vinyl chloride. Aluminum flake is also partially coated in U.S. Pat. No. 3,532,662. Here the coating was carried out with a random copolymer of methyl methacrylate and methacrylic acid adsorbed on the pigment. By this method, a dispersion is made of the solid particles in a liquid continuous phase comprising an organic liquid containing in solution a polymer which is adsorbed by the particles and a stabilizer, and modifying the polarity of the continuous phase so that the polymer is insoluble therein, the stabilizer being a compound containing an anchor component which becomes associated with the adsorbed polymer on the particle surface and a pendant chain-like component which is solvated by the modified continuous phase and provides a stabilizing sheath around the particles. It is alleged that this improves the "wetting" of the treated particles by the film-forming material dispersion-type coating composition.

Powder paints have certain advantages over conventional liquid paints in that they are essentially free of volatile solvents but they also present problems which differ from the problems with liquid paints. These differences include differences with respect to employment of aluminum flakes as a color producing component. For instance, when flakes partially coated by resin precipitate are employed in liquid paints, there remains the organic solvent and other components of the solution to prevent direct exposure of the flake to the atmosphere and other external influences. Further, in powder paints, if aluminum flake is coated, the coating must be a relatively dry solid and the size, weight and continuity of the organic encapsulation are all factors in affecting the distribution of such particles when electrostatically sprayed with the powder that is the principal film-former of the coating composition.

THE INVENTION

This invention is concerned with the preparation, use and composition of powder paints containing metal particles, particularly aluminum flakes, and, in most applications, at least one non-metal color producing component. The "non-metal color producing component" may be a particulate pigment, dye or tint and may be either organic, e.g., carbon black, or inorganic, e.g., a metal salt.

In the practice of this invention, metal particles which are incorporated in powder paints to provide the metallic color component of a monochromatic or polychromatic finish are encapsulated in a thermoplastic, organic coating through which the metal particle is visible to the human eye. The coating which is preferably transparent, but may be translucent, allows a substantial percent of the metal flakes to be orientated parallel to the substrate even when the powder coating material is applied to the substrated by conventional electrostatic spray painting. The term "substantially transparent" is used herein to mean materials which are either transparent or translucent or partially transparent and partially translucent.

In accordance with this invention, the coated metal particles are admixed, i.e., cold blended, with the balance of the coating material after the principal film-former is in particulate form. The non-metal color producing component may be admixed with the film-forming powder before, after or during the addition of the coated metal particles but such component is preferably added before the coated metal particles. This order of mixing avoids degradation of the metal particles in any of the steps of preparing the film-forming powder.

The metal particles most often used as a metallic color producing component are aluminum flakes. To avoid unnecessary complication of the description of this invention, aluminum flakes will be used to illustrate the invention. It should be understood, however, that this method is applicable to any particulate metal used as a color producing component in a powder coating material. This includes particles which are solely metal, metal coated organic particles and polymer-sandwiched metal particles having exposed metal edges.

The film-former used to coat the metal particles in accordance with this invention may be the same as or different than the principal film-former of the powder coating material. The film-former used to coat the metal particles is an organic, polymeric, thermoplastic, film-former hereinafter more fully described.

The preferred method for coating the aluminum flakes is to disperse the flakes, preferably in the form of aluminum paste, in a small amount of thermoplastic film-former and a solvent for the film-former that is suitable for spray drying. The dispersion is then spray dried by conventional spray drying techniques. Since there is a small amount of film-former relative to the amount of metal flakes, the net result is a metal flake coated with a relatively thin, continuous coating of the thermoplastic film-former as opposed to a metal flake imbedded in a relatively large particle of the film-former.

More specifically, one first disperses the aluminum flakess in about 2 to about 200 weight percent of thermoplastic film-former, based on the actual weight of aluminum flakes, i.e., about 2 to about 200 parts by weight of thermoplastic film-former per 100 parts by weight aluminum flakes. In one embodiment wherein the coating of such flakes is relatively light, the aluminum flakes are dispersed in about 2 to about 30 weight percent of thermoplastic film-former based on the actual weight of the aluminum flakes, i.e., about 2 to about 30 parts by weight of thermoplastic film-former per 100 parts by weight aluminum flakes. In most applications, it will be found advantageous to use between 10 and 200, preferably between about 30 and about 70, parts by weight of thermoplastic film-former per 100 parts by weight aluminum flakes. When metal particles of different density are used, the weight of aluminum flakes of the same surface area can be used to determine the amount of film-former to use in coating the metal particles. When less than about 2 weight percent of the film-former is used complete encapsulation of the metal flakes may not result. When more than about 30 weight percent of the film-former is used, care must be taken in controlling the spray dry operation to minimize the formation of an excessive amount of spherical particles containing more than one metal flake. The incidence of full coverage is high in the 30 to 70 range above described. Such spherical particles can be removed from the other coated aluminum flakes by screening. The inclusion of large, multileafed particles in a cured coating provides an irregular appearance. A similar result may be obtained if one mixes the uncoated metal flakes with the principal film-former of powder paint while the latter is in liquid state and then removes the solvent.

Aluminum paste is aluminum flakes, usually about 60 to about 70 weight percent, in a small amount, usually about 30 to about 40 weight percent, of a liquid hydrocarbon solvent which serves as a lubricant, e.g., mineral spirits. A small amount of an additional lubricant, e.g., stearic acid, may be added during the milling operation which produces the aluminum flakes. Everett J. Hall originated the method of beating aluminum into fine flakes with polished steel balls in a rotating mill while the flakes are wet with a liquid hydrocarbon. See U.S. Pat. No. 1,569,484 (1926). A detailed description of aluminum paste, its manufacture, flake size, testing, uses in paint, etc. is found in *Aluminum Paint and Powder*, J. D. Edwards and Robert I. Wray, 3rd Ed. (1955), Library of Congress Catalog Card Number: 55–6623, Reinhold Publishing Corporation, 430 Park Avenue, New York, New York, U.S.A. and the same is incorporated herein by reference.

The thermoplastic film-former used to coat the aluminum flakes may be the same as or different from the principal film-former of the powder coating composition. When the principal film-former is thermoplastic, it is preferred to have the film-former used to coat the aluminum flakes of the same composition as the principal film-former.

The best acrylic, thermoplastic, powder coatings known to applicants are copolymers of alpha-beta olefinically unsaturated monomers. These are made up either solely or predominantly of acrylic monomers, i.e., in excess of 51 weight percent acrylic monomers, the balance is made up of $C_8$ - $C_{12}$ monovinyl hydrocarbons, e.g., styrene, vinyl toluene, alpha methyl styrene, tertiary butyl styrene, and acrylic or methacrylic acid. The acrylates and methacrylates used in either of these embodiments are preferably esters of a $C_1$ - $C_8$ monohydric alcohol and acrylic acid or methacrylic acid or mixture of acrylic and methacrylic acids. Thus, such a copolymer would contain about 46 to about 100 weight percent of esters of a $C_1$ - $C_8$ monohydric alcohol and acrylic or methacrylic acid, 0 to about 49 weight percent of $C_8$ - $C_{12}$ monovinyl hydrocarbons and 0 to about 5 weight percent acrylic or methacrylic acid with the sum of the aforementioned esters and acrylic or methacrylic acid comprising in excess of 51 weight percent of the comonomers as stated earlier in this paragraph. One such copolymer contains about 76 to about 81 mole percent methyl methacrylate, 1 to 3 mole percent acrylic acid or methacrylic acid or a mixture of acrylic and methacrylic acids, and 16 to 23 mole percent butyl methacrylate.

One thermoplastic film-former preferred for use as the principal film-former is an acrylic polymer having a molecular weight ($M_n$) in the range of 30,000 to 80,000 and a glass transition temperature in the range of 60°C. to 110°C. and is exemplified by the thermoplastic acrylic powder coating composition disclosed in U.S. patent application Ser. No. 172,227 filed Aug. 16, 1971. The disclosures of this patent application are incorporated herein by reference. Ideal for coating the aluminum flakes for use with these paints are polymeric mixtures of the same composition but of lower molecular weight.

When a thermoplastic film-former is chosen for use in coating the aluminum flake in accordance with this invention, such material should be operationally compatible with the principal film-former to be chosen for the principal film-former. Also the volatile solvent or solvents employed to carry out the solution coating and spray drying steps are chosen with a view to the solvency of the coating material and their effectiveness in spray drying. Starting with this concept, the details for a given flake coating or given principal film-former are, of course, well within the skill of the paint makers art. With the foregoing in mind, other thermoplastic film-formers which can be used to encapsulate the aluminum flake include, but not by way of limitation (1) acrylic homopolymers, e.g., poly (methyl methacrylate), poly (acrylonitrile), poly (ethyl methacrylate), and poly (methyl acrylate), (2) acrylic copolymers, e.g., ethyl-methyl acrylate copolymers, ethylene-ethyl acrylate copolymers, and ethylene-ethyl methacrylate copolymers, (3) vinyl hydrocarbon — acrylic copolymers, e.g., styrene-methyl methacrylate copolymers, styrene-methyl acrylate copolymers, and styrene-ethyl acrylate copolymers, (4) vinyl hydrocarbon monopolymers, e.g., polystyrene, (5) ethylene allyl copolymers, e.g., ethylene-allyl alcohol copolymers, ethylene-allyl acetate copolymers, and ethylene-allyl benzene copolymers, (6) cellulose derivations, e.g., cellulose acetate, cellulose butyrate, cellulose propionate, cellulose acetate propionate, and ethyl cellulose, (7) polyesters, (8) polyamides, e.g., polyhexamethylene adipamide, polyhexamethylene sebacamide, and polycaprolactam, (9) poly (vinyl butyral), (10) poly (vinyl alcohol), and (11) poly (vinyl acetal), (12) ethylene vinyl acetate copolymers, (13) ethylene-vinyl alcohol copolymers. Thermoplastic powder coating materials, their preparation and use are disclosed in U.S. Pat. No. 3,532,530 which is incorporated herein by reference.

The principal film-former of the paint with which the thermoplastic coated aluminum flakes is blended may be a thermosettable film-former. The preferred film-formers for this purpose include thermosettable copolymer systems comprising: (a) an epoxy-functional copolymer of monovinyl monomers and as crosslinking agent therefor a $C_4$ - $C_{20}$, saturated, straight chain, aliphatic, dicarboxylic acid crosslinking agent-exemplified by U.S. patent application Ser. No. 172,236 filed Aug. 16, 1971, now U.S. Pat. No. 3,752,870: (b) an epoxy-functional copolymer of monovinyl monomers and as crosslinking agent therefor a mixture of about 90 to 98 percent by equivalent weight of a $C_4$ - $C_{20}$, saturated, straight chain, aliphatic dicarboxylic acid and about 10 to about 2 percent by equivalent weight of a $C_{10}$ - $C_{22}$, saturated, straight chain, aliphatic, monocarboxylic acid-exemplified by U.S. Pat. No. 3,730,930; (c) an epoxy-functional copolymer of monovinyl monomers and as crosslinking agent therefor a diphenol having a molecular weight in the range of about 110 to about 550 — exemplified by U.S. patent application Ser. No. 172,228 filed Aug. 16, 1971, now U.S. Pat. No. 3,758,634; (d) an epoxy-functional copolymer of monovinyl monomers and as crosslinking agent therefor a carboxy terminated polymer-exemplified by U.S. patent application Ser. No. 172,229 filed Aug. 16, 1971, now U.S. Pat. No. 3,781,380; (e) an epoxy-functional copolymer of monovinyl monomers and as crosslinking agent a phenolic hydroxy terminated polymer - exemplified by U.S. patent application Ser. No. 172,225 filed Aug. 16, 1971, now U.S. Pat. No. 3,887,520; (f) an epoxy-functional, carboxy-functional, self-crosslinkable copolymer of ethylenically unsaturated monomers — exemplified by U.S. patent application Ser. No. 172,238 filed Aug. 16, 1971, now U.S. Pat. No. 3,770,848; (g) a hydroxy-functional, carboxy-functional copolymer of monoethylenically unsaturated monomers — exemplified by U.S. patent application Ser. No. 172,237 filed Aug. 16, 1971, now U.S. Pat. No. 3,787,340; (h) an epoxy-functional copolymer of monovinyl monomers and as crosslinking agent therefor an anhydride of a dicarboxylic acid — exemplified by U.S. patent application Ser. No. 172,224 filed Aug. 16, 1971, now U.S. Pat. No. 3,781,379; (i) a hydroxy-functional copolymer of monoethylenically unsaturated monomers and as crosslinking agent therefor a compound selected from dicarboxylic acids, melamines, and anhydrides — exemplified by U.S. patent application Ser. No. 172,223 filed Aug. 16, 1971 and abandoned in favor of continuation application Ser. No. 407,128 filed Oct. 17, 1973 in turn abandoned in favor of continuation-in-part application Ser. No. 526,547 filed Nov. 25, 1974; (j) an epoxy-functional copolymer of monovinyl monomers and as crosslinking agent therefor a compound containing tertiary nitrogen atoms — exemplified by U.S. patent application Ser. No. 172,222 filed Aug. 16, 1971, now U.S. Pat. No. 3,758,635; (k) a copolymer of an alpha-beta unsaturated carboxylic acid and an ethylenically unsaturated compound and as crosslinking agent therefor an epoxy resin having two or more epoxy groups per molecule - as exemplified by U.S. patent application Ser. No. 172,226 filed Aug. 16, 1971, now U.S. Pat. No. 3,758,633; (l) a self-crosslinkable, epoxy-functional, anhydride-functional copolymer of olefinically unsaturated monomers — exemplified by U.S. patent application Ser. No. 172,235 filed Aug. 16, 1971 now U.S. Pat. No. 3,758,632; (m) an epoxy-functional copolymer of monovinyl monomers and as crosslinking agent therefor a carboxy terminated polymer, e.g., a carboxy terminated polymer, e.g., a carboxy terminated polyester, — exemplified by application Ser. No. 223,746 filed Feb. 4, 1972 and abandoned in favor of continuation-in-part application Ser. No. 489,271 filed Aug. 5, 1971; (n) an epoxy-functional copolymer of vinyl monomers and as crosslinking agent therefor a dicarboxylic acid — exemplified by U.S. patent application Ser. No. 228,262 filed Feb. 22, 1972, now U.S. Pat. No. 3,787,521; (o) an epoxy-functional and hydroxy-functional copolymer of monovinyl monomers and crosslinking agent therefor a $C_4$ - $C_{20}$, saturated, straight chain, aliphatic dicarboxylic acid — exemplified by U.S. patent application Ser. No. 394,874 filed Sept. 6, 1973 and abandoned in favor of continuation-in-part application Ser. No. 552,676 filed Feb. 24, 1975; (p) an epoxy-functional copolymer of monovinyl monomers with optional hydroxy and/or amide functionality and as crosslinking agent therefore (1) a $C_4$-$C_{20}$, saturated, straight chain, aliphatic dicarboxylic acid and (2) a polyanhydride — exemplified by U.S. patent application Ser. No. 344,881 filed Sept. 6, 1973 and now abandoned in favor of continuation-in-part application Ser. No. 552,556 and continuation-in-part application Ser. No. 552,557 both filed Feb. 24, 1975; (q) an epoxy-functional amide-functional copolymer of monovinyl monomers and as cross-linking agent therefor an anhydride of a dicarboxylic acid — exemplified by U.S. patent application Ser. No. 394,880 filed Sept. 6, 1973 and now abandoned in favor of continuation-in-part application Ser. No. 552,572 filed Feb. 24, 1975; (r) an epoxy-functional, hydroxy-functional copolymer of monovinyl monomers and as crosslinking agent therefore an anhydride of a dicarboxylic acid — exemplified by U.S. patent application Ser. No. 394,879 filed Sept. 6, 1973 and now abandoned in favor of application Ser. No. 552,511 filed Feb. 24, 1975; (s) an epoxy-furnctional, amide-functional copolymer of monovinyl monomers and as crosslinking agent therefore a carboxy-terminated polymer — exemplified by U.S. patent application Ser. No. 394,875 filed Sept. 6, 1973 and now abandoned in favor of continuation-in-part application Ser. No. 552,518 filed Feb. 24, 1975; (t) an epoxy-functional copolymer of monovinyl monomers and as crosslinking agent therefore a monomeric or polymeric anhydride and a hydroxy carboxylic acid — exemplified by U.S. patent application Ser. No. 394,878 filed Sept. 6, 1973 and now abandoned in favor of continuation-in-part application Ser. No. 552,079 filed Feb. 24, 1975; (u) an epoxy-functional, amide-functional copolymer of monovinyl monomers and as cross-linking agent therefore a monomeric or polymeric anhydride and a hydroxy carboxylic acid - exemplified by U.S. patent application Ser. No. 394,877 filed Sept. 6, 1973 and now abandoned in favor of continuation-in-part application Ser. No. 552,078 filed Feb. 24, 1975; and (v) an epoxy-functional, hydroxy-functional copolymer of monovinyl monomers and as crosslinking agent therefore a monomeric or polymeric anhydride and a hydroxy carboxylic acid — exemplified in U.S. patent application Ser. No. 394,876 filed Sept. 6, 1973 and now abandoned in favor of continuation-in-part application Ser. No. 552,077 filed Feb. 24, 1975.

The disclosures of the aforementioned patents and patent applications are incorporated herein by reference.

Other thermoset film-formers suitable for use in coating the metal particles include, but not by way of limitation thermosettable systems in which the polymeric component is a polyester, a polyepoxide and urethane-modified polyesters, polyepoxides and acrylics. As with the acrylics heretofore more specifically described, these may be self-crosslinking polymers or may be a combination of functional polymer and a coreactable monomeric compound which serves as crosslinking agent.

The preferred thermosettable powder paints known to applicants for automotive topcoats, the use wherein metallic pigments find their greatest use, consist essentially of an epoxy-functional copolymer of olefinically unsaturated monomers and a crosslinking agent therefor. Such paints, exclusive of pigments, may also contain flow control agents, catalysts, etc. in very small quantities.

The copolymer referred to in the preceding paragraph has average molecular weight ($M_n$) in the range of about 1,500 to about 15,000 and glass transition temperature in the range of about 40°C. to about 90°C. The epoxy functionality is provided by employing a glycidyl ester of a monoethylenically unsaturated carboxylic acid, e.g., glycidyl acrylate or glycidyl methacrylate, as a constituent monomer of the copolymer. This monomer should comprise about 5 to about 20 weight percent of the total. Additional functionality, e.g., hydroxy functionality or amide functionality, may also be employed by inclusion of a $C_5$ - $C_7$ hydroxy acrylate or methacrylate, e.g., hydroxyethyl acrylate, hydroxyethyl methacrylate, hydroxypropyl acrylate, or hydroxypropyl methacrylate, or an alpha-beta olefinically unsaturated amide, e.g., acrylamide or methacrylamide, among the constituent monomers. When such additional functionality is used, the monomers providing it comprise about 2 to about 10 weight percent of the constituent monomers. The balance of the copolymer, i.e., about 70 to about 93 weight percent of the constituent monomers, are made up of monofunctional, olefinically unsaturated monomers, i.e., the sole functionality being ethylenic unsaturation. These monofunctional, olefinically unsaturated monomers are, at least in major proportion, i.e., in excess of 50 weight percent of the constituent monomers, acrylic monomers. The preferred monofunctional acrylic monomers for this purpose are esters of $C_1$ - $C_8$ monohydric alcohols and acrylic or methacrylic acid, e.g., methyl methacrylate, ethyl acrylate, propyl methacrylate, butyl acrylate, butyl methacrylate, hexyl acrylate and 2-ethylhexyl acrylate. In this preferred embodiment, the remainder, if any, aside from the aforementioned epoxy, hydroxy and amide functional monomers which also have olefinic unsaturation functionality used up in the polymerization formation of the copolymer, is preferably made up to $C_8$ - $C_{12}$ monovinyl hydrocarbons, e.g., styrene, vinyl toluene, alpha methyl styrene and tertiary butyl styrene. Other vinyl monomers which are suitable in minor amounts, i.e., between 0 and 30 weight percent of the constituent monomers, include vinyl chloride, acrylonitrile, methacrylonitrile, and vinyl acetate.

The crosslinking agents employed with the aforedescribed copolymer will have functionality that will react with the functionality of the copolymer. Thus, all of the crosslinking agents heretofore mentioned in the recital of powder paint patents and patent applications, e.g., $C_4$ - $C_{20}$ saturated, aliphatic dicarboxylic acids, mixtures of $C_4$ - $C_{20}$ saturated aliphatic dicarboxylic acids and monocarboxylic acids of carbon number in the same range, carboxy terminated copolymers having molecular weight ($M_n$) in the range of 650 to 3,000, monomeric anhydrides preferably anhydrides having a melting point in the range of about 35° to 140°C., e.g., phthalic anhydride, maleic anhydride, cyclohexane-1,2-dicarboxylic anhydride, succinic anhydride, etc., homopolymers of monomeric anhydrides, and mixtures of such anhydrides and hydroxy acids having a melting point in the range 40° to 150°C., are suitable for use as cross-linking agents for these copolymers. The disclosures of all patents and patent applications recited herein are incorporated herein by reference. In general, these crosslinking agents are employed in amounts such as to provide between about 0.3 and about 1.5, preferably between about 0.8 and about 1.2, functional groups which are reactable with functional groups on the copolymer per functional group on the copolymer.

The term "vinyl monomer" as used herein means a monomeric compound having in its molecular structure the functional group

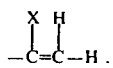

wherein X is a hydrogen atom or a methyl group.

"Alpha-beta unsaturation" as used herein includes both the olefinic unsaturation that is between two carbon atoms which are in the alpha and beta positions relative to an activating group such as a carboxyl group, e.g., the olefinic unsaturation of maleic anhydride, and the olefinic unsaturation between the two carbon atoms which are in the alpha and beta positions with respect to the terminus of an aliphatic carbon-to-carbon chain, e.g., the olefinic unsaturation of acrylic acid or styrene.

DETAILED DESCRIPTION OF THE INVENTION

The preparation of the coated metal flakes is carried out in a solvent for the film-former that is sufficiently volatile for efficient spray drying and which will not chemically react with either the film-former or the metal flakes to a degree that will significantly modify their properties or appearance within the contact times employed to carry out the spray drying process. A preferred solvent for this purpose is methylene chloride. Other solvents which can be used include toluene, xylene, methyl ethyl ketone, methanol, acetone and low boiling napthas.

A typical formulation for a feed stock for the spray drier in accordance with this invention would include the following:

|  | Parts by Weight |
|---|---|
| aluminum paste (65% Al) | 30.00 |
| film-former | 11.00 |
| MeCl$_2$ | 200.00 |

Typical operating parameters for a conventional, 3 ft. diameter spray drier equipped with a conventional two-fluid nozzle atomizer, e.g., a gas and a liquid as in a conventional air-atomizing, liquid-paint, spray gun, are as follows:

| air flow | 197 cubic feet/minute |
|---|---|
| feed flow | 380 ml/minute |
| inlet air temperature | 180°F. |
| outlet air temperature | 80°F. |
| product rate | 6 lbs./hr. |

The coated aluminum, as received from the spray drier, is then sieved through a screen of desired particle size, e.g., a 44 micron screen, to remove excessively large particles. Approximately 20 percent of the product in the form of oversize particles is discarded.

The non-metal powder component, hereinafter called the "powder component" comprises the primary film-forming component and, where the finish is to be polychromatic, at least one non-metal color producing component. This non-metal color producing component may be a particulate pigment, dye or tint. For purposes of this invention, white and black shall be considered colors inasmuch as a light reflecting or light absorbing material must be added to the organic film-former to provide the finish with a white or black appearance in the same manner that a material must be added to the organic film-former to reflect light rays that convey to the eye one color while absorbing others.

The formulation of the non-metal powder component, which in the case of a polychromatic finish contains a non-metal color producing component, is prepared taking into consideration the particular color chosen for employment with the metallic color component and the amount of the metallic color component to be employed. The powder component is quantitatively formulated taking into account the amount of material to be brought in through the addition of the coated metal particles.

A typical composition for the powder component is as follows:

|  | Parts by Weight |
|---|---|
| film-former | 94.33 |
| flow control additive | 0.67 |
| pigment | 5.00 |

The preparation and processing of the non-metal powder component into powder form is carried out by one of the conventional powder preparation techniques, e.g., extrusion, spray drying, or solvent extraction. Once in powdered form, this material is sieved through a suitable screen, e.g., a 74 micron screen.

The final step in the preparation of the powder coating material of this invention is the blending of the two major components, i.e., the thermoplastic, organic coated particles metal component and the non-metal powder component. The exact proportions of the two major components will, of course, depend on the specific formulation and the amount of metal needed. In the typical example aforedescribed, if one blends about 98.5 parts by weight of the non-metal powder component with about 1.5 parts by weight of the coated aluminum, a "low metallic" automotive top coat paint results.

The coated flakes of this invention, of course, can be used with any thermoplastic or thermosettable powder paint.

Appearance of the finished coating will, of course, be a primary factor in selecting the total concentration of aluminum flakes in the total powder paint composition. This concentration will vary from a very low weight percent of the total powder paint composition in some polychromatic finishes, i.e., as low as about 0.005 weight percent, advantageously above 0.25 weight percent and preferably above 0.5 weight percent, to a much higher weight percent of the total powder paint composition in the so-called "Argent" finishes, i.e., as high as about 25 weight percent. If, for example, the spray dried coating on the flakes comprises about 2 to about 30 weight percent by weight of the flakes, then, the coated flakes will comprise between about 0.005 to about 32.50, advantageously between about 0.25 to about 28.75, and preferably between about 0.54 to about 28.25, weight percent of the total powder paint composition.

This method provides the additional advantage that the thin layer of organic coating on the aluminum flakes substantially reduces the danger of explosions which exists with dry aluminum flakes. The usual handling of dry aluminum under inert atmosphere is not required after the flakes are coated.

This invention will be more fully understood from the following illustrative examples:

EXAMPLE 1 a. Preparation of the Coated Aluminum Flakes

A thermoplastic coating material for coating aluminum flake is prepared from the following materials using the procedure hereinafter outlined:

|  | Parts by Weight |
|---|---|
| poly (methyl methacrylate) $M_n = 15,000$ | 100 |
| poly (lauryl methacrylate) $M_n = 10,000$ | 2 |

The above ingredients are mixed together in a twin shell tumbling mixer for 10 minutes and then mill rolled at 190°C. for 15 minutes. The blend is cooled and pulverized to pass through a 200 mesh screen.

Two (2) parts by weight of this thermoplastic mixture are combined with 30 parts by weight of aluminum paste (35 percent by weight mineral spirits and 65 percent by weight aluminum flakes that will pass through a 325 mesh screen and have typical surface area of 7.5 m²/gram, maximum particle diameter below 45 microns and most common particle size distribution in the range of about 7 to about 15 microns) and 200 parts by weight of methylene chloride under low shear agitation so as to disperse the aluminum in the thermoplastic material without damage to the aluminum flakes.

Once the above dispersion has been prepared, it is spray dried in a manner which produces individual aluminum flakes coated with a thin, continuous coating of dry polymers. This is accomplished in a 3 foot diameter spray drier equipped with a two-fluid nozzle in counter-current position using the following conditions:

| air flow in drying chamber | 200 cubic feet |
|---|---|
| feed rate of mixture | 380 ml/minute |
| inlet air temperature | 180° F. |
| two fluid atomization air pressure | 80 lbs. |

The product obtained from this process has an overall composition of about 19.5 parts by weight of aluminum, about 2.0 parts by weight of the thermoplastic mixture above described in this example, and a small amount of residual solvent, i.e., 0.05 to 0.2 parts, that has not volatilized during the spray dry process. This product is then screened through a 44 micron screen.

b. Preparation of the Non-Metal Powder Component

A thermoplastic powder paint is prepared from the following materials using the procedure and materials hereinafter described;

|  | Parts By Weight |
|---|---|
| poly (methyl methacrylate) $M_n = 40,000$ | 100 |
| poly (lauryl methacrylate) $M_n = 120,000$ | 2 |
| tetrabutylammonium bromide | 0.5 |

The above ingredients are mixed in a twin shell tumbling mixer for 10 minutes and then mill rolled at 190°C. for 15 minutes. The blend is cooled and pulverized to pass through a 200 mesh screen.

The non-metal powder component of the powder coating composition is prepared by mixing 188 parts by weight of this thermoplastic material with the following materials:

|  | Parts By Weight |
|---|---|
| poly (lauryl acrylate) $M_n = 10,000$ | 1.34 |
| phthalo green pigment | 2.77 |
| yellow iron oxide pigment | 7.24 |

A homogeneous mixture of the above is obtained by ball milling for 2 hours. This mixture is then extruded at 100°C. from a kneading extruder. The solid thus obtained is pulverized in an impact mill, i.e., an air classified impact mill, and sieved through a 200 mesh screen.

c. Preparation of the Powder Coating Material

A powder coating material in accordance with this invention is produced by mixing 1.65 parts by weight of the coated aluminum flakes with 98.35 parts by weight of the non-metal powder component. A homogeneous mixture of the two components is obtained by rapidly tumbling the material in a partially filled container for 20 minutes under ambient room conditions, i.e., about 65° to 75°F. In preparing the powder by this method, it will be obvious to those skilled in the art that actual mixing times will vary somewhat with the size of the container and the mechanical action.

The powder thus obtained is then sprayed on an electrically grounded steel substrate with a conventional electrostatic powder spray gun operating at about 50 KV charging voltage. After spraying, the coated surface is heated to about 392°F. for about 20 minutes. The coating thus obtained has good gloss and metal particle orientation.

EXAMPLE 2

A powder coating material is prepared following the procedure of Example 1 with the following differences:
1. The starting mixture for preparation of the coated aluminum flakes is of the following composition:

|  |  | Parts By Weight |
|---|---|---|
| aluminum paste (65% by weight aluminum and 35% by weight mineral spirits | | 30.00 |
| thermoplastic mixture | | 5.46 |
| (a) poly (methyl methacrylate) $M_n = 12,000$ and | 100 | |
| (b) poly (lauryl methacrylate) $M_n = 9,000$ | 2 | |
| poly (butyl acrylate) $M_n = 9,000$ | | 0.03 |
| methylene chloride | | 250.00 |

This material is mixed and spray dried as in Example 1 and in the resultant material the flakes have coating about 2.5 times thicker than that of the coated flakes of Example 1. The empirical composition of the spray dried product by weight is as follows:

|  | Parts by Weight |
|---|---|
| aluminum (dry) | 19.5 |
| thermoplastic coating | 5.49 |

2. Since the amount of coating on the aluminum flakes is here large enough to be a significant factor, it is taken into consideration when formulating the non-metal powder component. Here, the non-metal powder component is prepared by combining 188 parts by weight of the non-metal powder component of Example 1 (b) with the following:

| | Parts by Weight |
|---|---|
| poly (lauryl acrylate) $M_n$=10,000 | 1.33 |
| phthalo green pigment | 1.85 |
| yellow iron oxide | 9.18 |

Subsequent processing of the non-metal powder component is the same as in Example 1.

3. In the blending of the coated metal component and the non-metal powder component is altered because of the thickness of coating on the aluminum flakes. The ratio here is 1.93 parts by weight of coated aluminum with 98.08 parts by weight of the non-metal powder component. The resultant powder coating maintains the pigment level and has the following composition:

| | Parts by Weight |
|---|---|
| aluminum | 1.50 |
| thermoplastic coating material | 93.58 |
| phthalo green pigment | 1.50 |
| yellow iron oxide | 3.42 |

This material is mixed, screened, electrostatically sprayed on a steel substrate and heat cured as in Example 1. The finish obtained has properties similar to the coatings prepared in Example 1.

EXAMPLE 3

The procedure of Example 1 is repeated except for the difference that the non-metal powder component (b) is prepared by the same procedure but with different materials. Here, the thermoplastic film-former is made up of the following materials:

| | Parts by Weight |
|---|---|
| poly (methyl methacrylate) $M_n = 60,000$ | 100 |
| poly (tridecyl methacrylate) $M_n = 80,000$ | 4 |
| tribenzylammonium chloride | 0.2 |

EXAMPLE 4

The procedure of Example 1 is repeated except for the differences that the film-former for coating the aluminum flake in (a) is prepared by the same procedure but with different materials and the non-metal powder component (b) is prepared by the same procedure but with different materials: The film-former used to coat the aluminum flakes (a) in this example is made up of a mixture of:

| | Parts by Weight |
|---|---|
| poly (methyl methacrylate) $M_n = 10,000$ | 100 |
| poly (butyl methacrylate) $M_n = 15,000$ | 6 |

The film-former of the non-metal powder component (b) in this example is made up of a mixture of:

| | Parts by Weight |
|---|---|
| poly (methyl methacrylate) $M_n = 80,000$ | 100 |
| poly (butyl methacrylate) $M_n = 100,000$ | 6 |
| stearyldimethyl benzyl-ammonium chloride | 0.6 |

EXAMPLE 5

The procedure of Example 1 is repeated except for the difference that the film-former of the non-metal powder component (b) is prepared by the same procedure but with different materials. Here, the thermoplastic film-former is made up of the following materials:

| | Parts by Weight |
|---|---|
| acrylate copolymer ($M_n$=15,000) (75 parts methyl methacrylate and 25 parts butyl methacrylate) | 100 |
| poly (2-ethylhexyl acrylate) $M_n = 10,000$ | 0.8 |
| tetraethyl ammonium bromide | 0.3 |

EXAMPLE 6

The procedure of Example 5 is repeated with the sole exception that the copolymer of 75 parts methyl methacrylate and 25 parts butyl methacrylate is replaced with an equal amount of a copolymer of 60 parts methyl methacrylate and 40 parts butyl methacrylate ($M_n = 80,000$).

EXAMPLE 7

The procedure of Example 5 is repeated with the sole exception that the copolymer of 75 parts methyl methacrylate and 25 parts butyl methacrylate is replaced with an equal amount of copolymer of a copolymer of 80 parts methyl methacrylate and 20 parts ethyl acrylate ($M_n = 80,000$).

EXAMPLE 8

The procedure of Example 5 is repeated with the sole exception that the copolymer of 75 parts methyl methacrylate and 25 parts butyl methacrylate is replaced with an equal amount of a copolymer of 85 parts styrene and 15 parts butyl acrylate.

EXAMPLE 9

The procedure of Example 1 is repeated with the difference that the film-former of the non-metal powder component (b) is prepared by the same procedure but with different materials. Here, the thermoplastic film-former is made up of the following materials:

| | Parts by Weight |
|---|---|
| acrylate copolymer — $M_n = 40,000$ (a copolymer of 98 parts methyl methacrylate and 2 parts of glycidyl methacrylate) | 100 |
| polybutyl acrylate $M_n = 50,000$ | 0.8 |
| triethylene diamine | 0.2 |

EXAMPLE 10

The procedure of Example 1 is repeated with the difference that the film-former of the non-metal powder component (b) is prepared using the materials and procedures hereinafter set forth.

An epoxy-functional acrylic copolymer of vinyl monomers is prepared as follows:

| Ingredients | Parts By Weight |
| --- | --- |
| glycidyl methacrylate | 15 |
| methyl methacrylate | 45 |
| butyl methacrylate | 40 |

The above named ingredients are mixed together. Three (3) parts by weight of 2,2' — azobis — (2-methylpropionitrile), hereinafter called AIBN, is dissolved in the monomer mixture. The mixture is slowly added to refluxing toluene (100 parts) which is stirred vigorously under a nitrogen atmosphere. A condenser is provided at the top of the toluene container to condense the toluene vapors and return them to the container. The monomer mixture is added through a regulating valve and the rate of addition is controlled to maintain a reflux temperature (109°C. - 112°C.) with only a small fraction of heat supplied from an external heater. After the addition of the monomer mixture is complete, the refluxing is maintained by external heat source for 3 additional hours.

The solution is poured into a shallow stainless steel trays. These trays are placed in a vacuum oven and the solvent evaporated therefrom. As the solvent is removed, the copolymer solution becomes more concentrated. The temperature of the vacuum oven is raised to about 110°C. Drying is continued until the solvent content of the copolymer is below 3 percent. The trays are cooled and the copolymer collected and ground to pass through a 20 mesh screen. The copolymer has a glass transition temperature of 53°C. and a molecular weight ($M_n$) of 4,000.

One hundred parts by weight of the ground copolymer are mixed with the following materials:

| | Parts By Weight |
| --- | --- |
| azelaic acid | 10.0 |
| tetrabutyl ammonium bromide | 0.2 |
| poly (lauryl acrylate) ($M_n$=10,000) | 0.5 |

The materials are mixed together in a ball mill for 2 hours. The mixture is mill rolled at 85°C. to 90°C. for 5 minutes. The solid obtained is ground in a ball mill and the powder is sieved with a 140 mesh screen.

EXAMPLE 11

The procedure of Example 10 is repeated with the difference that the film-former of the non-metal powder component is prepared as in Example 10 using 166 parts by weight of the ground epoxy-functional copolymer of Example 10, 22.64 parts by weight of azelaic acid and 1.33 poly (lauryl acrylate) — $M_n$ = 10,000.

EXAMPLE 12

The procedure of Example 1 is repeated except for the differences:
1. The coating of the aluminum flakes is prepared from 30 parts by weight of the same aluminum paste used in Example 1 (19.5 parts by weight aluminum) and 4.7 parts by weight of the thermoplastic coating material.
2. Following the procedure of Example 2, the non-metal powder component is adjusted and employed in an amount with the coated aluminum flakes to provide the powder coating material to be sprayed with the same level of pigment loading as in such material in Example 1.

The resultant powder coating material is electrostatically sprayed upon a steel substrate and heat cured thereon as in Example 1 and the resultant finish has similar appearance to that obtained in Example 1.

EXAMPLE 13

The procedure of Example 1 is repeated except for the differences:
1. The coating of the aluminum flakes is prepared from 30 parts by weight aluminum paste used in Example 1 (19.5 parts by weight aluminum) and 0.98 parts by weight of the thermoplastic coating material.
2. Following the procedure of Example 2, the non-metal powder component is adjusted and employed in an amount with the coated aluminum flakes to provide the powder coating material to be sprayed with the same level of pigment loading as in such material in Example 1.

The resultant powder coating material is electrostatically sprayed upon a steel substrate and heat cured thereon as in Example 1 and the resultant finish has similar appearance to that obtained in Example 1.

EXAMPLE 14

The procedure of Example 1 is repeated except for the differences:
1. The coating of the aluminum flakes is prepared from 30 parts by weight of aluminum paste used in Example 1 (19.5 parts by weight aluminum) and 2.93 parts by weight of the thermoplastic coating material.
2. Following the procedure of Example 2, the non-metal powder component is adjusted and employed in an amount with the coated aluminum flakes to provide the powder coating material to be sprayed with the same level of pigment loading as in such material in Example 1.

The resultant powder coating material is electrostatically sprayed upon a steel substrate and heat cured thereon as in Example 1 and the resultant finish has similar appearance to that obtained in Example 1.

EXAMPLE 15

The procedure of Example 1 is repeated except for the differences:
1. The coating of the aluminum flakes is prepared from 30 parts by weight of aluminum paste (19.5 parts by weight aluminum) and 1.76 parts by weight of the thermosettable material.
2. Following the procedure of Example 2, the non-metal powder component is adjusted and employed in an amount with the coated aluminum flakes to provide the powder coating material to be sprayed with the same level of pigment loading as in such material in Example 1.

The resultant powder coating material is electrostatically sprayed upon a metal substrate and heat cured thereon as in Example 1 and the resultant finish has similar appearance to that obtained in Example 1.

EXAMPLE 16

The procedure of Example 1 is repeated except for the differences:
1. The coating of the aluminum flakes is prepared from 30 parts by weight of the aluminum paste used in Example 1 (19.5 parts by weight aluminum) and 2.54 parts by weight of the thermoplastic coating material.
2. Following the procedure of Example 2, the non-metal powder component is adjusted and employed in an amount with the coated aluminum flakes to provide the powder coating material to be sprayed with the same level of pigment loading as in such material in Example 1.

The resultant powder coating material is electrostatically sprayed upon a metal substrate and heat cured thereon as in Example 1 and the resultant finish has similar appearance to that obtained in Example 1.

EXAMPLE 17

The procedure of Example 1 is repeated except for the differences:
1. The coating of the aluminum flakes is prepared from 30 parts by weight of the aluminum paste used in Example 1 (19.5 parts by weight aluminum) and 0.39 parts by weight of the thermoplastic coating material.
2. Following the procedure of Example 2, the non-metal powder component is adjusted and employed in an amount with the coated aluminum flakes to provide the powder coating material to be sprayed with the same level of pigment loading as in such material in Example 1.

EXAMPLE 18

The procedure of Example 1 is repeated except for the difference that the non-metal powder component is an epoxy-functional and hydroxy-functional copolymer of vinyl monomers prepared as follows:

| Reactants | Grams | Percent By Weight Of Total Reactants |
|---|---|---|
| glycidyl methacrylate | 225.0 | 15 |
| hydroxyethyl methacrylate | 75.0 | 5 |
| butyl methacrylate | 600.0 | 40 |
| styrene | 75.0 | 5 |
| methyl methacrylate | 525.0 | 35 |

The above mentioned monomers are admixed in the proportions above set forth and 70.0 grams (4.5 percent based on combined weights of reactants) of 2,2' — azobis — (2-methyl propionitrile), hereinafter called AIBN, are added to the monomer mixture. The solution is added dropwise over a 3 hour period into 1500 ml. toluene at 100° – 108°C. under nitrogen atmosphere. Then 0.4 grams of AIBN dissolved in 10 ml. of acetone are added over a ½ hour period and refluxing is continued for 2 additional hours.

The toluene-polymer solution is diluted in 1500 ml. acetone and coagulated in 16 liters of hexane. The white powder is dried in a vacuum oven at 55°C. for 24 hours. This copolymer has molecular weight — $M_w/M_n$ = 6750/3400 and the molecular weight per epoxy group is about 1068.

The thermosettable material is produced by mixing 166 parts of the epoxy-functional, hydroxy-functional copolymer with 22.65 parts by weight of azelaic acid, and 1.34 parts by weight of poly (lauryl acrylate — $M_n$ = 10,000).

A homogeneous mixture of the above is obtained by ball milling for 2 hours. This mixture is then extruded at 100°C. from a kneading extruder. The solid thus obtained is pulverized in an impact mill, i.e., an air classified impact mill, and sieved through a 200 mesh screen.

EXAMPLE 19

The procedure of Example 18 is repeated except for the difference that a functionally equivalent amount of poly (azelaic anhydride) is substituted for the azelaic acid.

EXAMPLE 20

The procedure of Example 19 is repeated except for the difference that about 35 percent of the poly (azelaic anhydride) is replaced with a functionally equivalent amount of 12-hydroxystearic acid.

EXAMPLE 21

The procedure of Example 18 is repeated with the following differences:
1. The epoxy-functional, hydroxy-functional copolymer is replaced with an epoxy-functional, amide-functional copolymer prepared from the below listed components in the manner hereinafter described.

| Reactants | Grams | Percent By Weight Of Total Reactants |
|---|---|---|
| glycidyl methacrylate | 45 | 15 |
| acrylamide | 15 | 5 |
| butyl methacrylate | 111 | 37 |
| methyl methacrylate | 129 | 43 |

The above mentioned monomers are admixed in the proportions above set forth and 11.0 grams of 2,2' — azobis — (2-methylpropionitrile), hereinafter called AIBN, are added to the mixture. The mixture is slowly added to 200 ml. of toluene heated to 80° – 90° C. which is being stirred vigorously under a nitrogen atmosphere. A condenser is provided at the top of the toluene container to condense the toluene vapors and return the condensed toluene to the container. The monomer mixture is added through a regulating valve and the rate of addition is controlled to maintain a reaction temperature of 90° – 110°C. with the rest of the heat supplied from an external heater. After the addition of the monomer mixture is completed (3 hours), 0.8 grams of AIBN dissolved in 10 ml. acetone is added over a ½ hour period and refluxing is continued for 2 additional hours.

The resultant toluene-polymer solution is diluted with 200 mls. acetone and coagulated in 2 liters of hexane. The white powder is dried in a vacuum over at 55°C. for 24 hours. Its molecular weight is determined to be $M_w/M_n$ = 6700/3200 and WPE (molecular weight per epoxide group) is about 1000.

2. The azelaic acid is replaced with a functionally-equivalent amount of a carboxy-terminated polymer cross-linking agent. This crosslinking agent is prepared in the following manner: Five hundred grams of a commercially available epoxy resin, Epon 1001, (epoxide equivalent 450°–525°, melting range 64° – 76°C. and molecular weight average 900°C.), is charged into a 500 ml. stainless steel beaker having a heating mantle. The epoxy resin is heated to 110°C. As the epoxy resin is stirred, 194 grams of azelaic acid is added. After a reaction time of 30 minutes, a homogeneous mixture is obtained. The mixture resin, only semi-reacted, is poured out into an aluminum pan and cooled. The solid mixture is pulverized to pass through a 100 mesh screen by use of a blender. The mixture resin is only semi-reacted because if fully reacted it could not be powdered.

EXAMPLE 22

The procedure of Example 1 is repeated except for the difference that the poly (lauryl acrylate — $M_n$ = 10,000) is replaced with an equivalent amount of polyethylene glycol perfluro octonoate ($M_n$=3400).

EXAMPLE 23

The procedure of Example 1 is repeated with the single difference that the coated aluminum flakes are mixed with the principal film-forming powder in an amount such that they comprise 0.1 weight percent of the total powder paint composition.

EXAMPLE 24

The procedure of Example 1 is repeated with the single difference that the coated aluminum flakes are mixed with the principle film-forming powder in an amount such that they comprise 32.50 weight percent of the total powder paint composition.

EXAMPLE 25

The procedure of Example 1 is repeated with the single difference that the coated aluminum flakes are admixed with the principal film-forming powder in an amount such that they comprise 0.25 weight percent of the total powder paint composition.

EXAMPLE 26

The procedure of Example 1 is repeated with the single difference that the coated aluminum flakes are mixed with the principal film-forming powder in an amount such that they comprise 28.75 weight percent of the total powder paint composition.

EXAMPLE 27

The procedure of Example 1 is repeated with the single difference that the coated aluminum flakes are mixed with the principal film-forming powder in an amount such that they comprise 0.45 weight percent of the total powder paint composition.

EXAMPLE 28

The procedure of Example 1 is repeated with the differences that the coated aluminum flakes are the sole metal-pigment used and they constitute 10 weight percent of the total powder paint composition. In this example, non-metal pigments are not used.

EXAMPLE 29

The procedure of Example 1 is repeated with the differences that the coated aluminum flakes are the sole metal-pigment used and they constitute 1 weight percent of the total powder paint composition. In this example, the non-metal pigments constitute 21.9 weight percent of the total powder paint composition.

EXAMPLE 30

The procedure of Example 1 is repeated with the following compositional differences. The coated aluminum flakes are mixed with the principal film-forming powder in an amount such that they comprise 31.0 weight percent of the total powder paint composition and the principal film-forming powder contains, as the sole non-metal pigment, phthalo green pigment in an amount such that it comprises 0.25 weight percent of the total powder paint composition.

EXAMPLE 31

The procedure of Example 1 is repeated with the following compositional differences. The coated aluminum flakes are mixed with the principal film-forming powder in an amount such that they comprise 4.0 weight percent of the total powder paint composition and the principal film-forming powder contains a mixture of metal-free pigments in an amount such that it comprises 22 weight percent of the total powder paint composition. The mixture of metal-free pigments consists predominantly of chrome yellow with flaventhron (yellow organic), red iron oxide and carbon black present from trace amounts to above one weight percent.

EXAMPLE 32

The procedure of Example 1 is repeated except for the differences that the aluminum flakes are coated with polyacrylonitrile $M_n$ = 15,000 and such coating is in the amount of 5 percent by weight of the aluminum flakes.

EXAMPLE 33

The procedure of Example 1 is repeated except for the differences that the aluminum flakes are coated with polyhexamethylene adipamide — $M_n$ = 5,000, and such coating is in the amount of 3 percent by weight of the aluminum flakes.

EXAMPLE 34

The procedure of Example 1 is repeated except for the differences that the aluminum flakes are coated with cellulose butyrate — $M_n$ = 10,000, the solvent is methanol, and such coating is in the amount of 5 percent by weight of the aluminum flakes. The temperature of the spray drier is adjusted to compensate for the change of solvent.

EXAMPLE 35

The procedure of Example 1 is repeated except for the differences that the aluminum flakes are coated with a polyester, i.e., glycol phthalate — $M_n$ = 5,000, the solvent is acetone and such coating is in the amount of 10 percent by weight of the aluminum flakes. The temperature of the spray drier is adjusted to compensate for the change of solvent.

EXAMPLE 36

The procedure of Example 1 is repeated except for the differences that the aluminum flakes are coated with a styrenemethyl methacrylate copolymer — $M_n$ = 15,000, the solvent is acetone and such coating is in the amount of 13 percent by weight of the aluminum flakes. The temperature of the spray drier is adjusted to compensate for the change of solvent.

EXAMPLE 37

The procedure of Example 1 is repeated except for the differences that the aluminum flakes are coated with cellulose acetate — $M_n$ = 15,000, the solvent is methanol, and such coating is in the amount of 7 percent by weight of the aluminum flakes. The temperature of the spray drier is adjusted to compensate for the change of solvent.

EXAMPLE 38

The procedure of Example 1 is repeated except for the differences that the aluminum flakes are coated with polystyrene, the solvent is toluene and the coating is in the amount of 2.5 percent by weight of the aluminum flakes. The temperature of the spray drier is adjusted to compensate for the change of solvent.

EXAMPLE 39

A series of powder paints, A-E are prepared from the following materials in the manner hereinafter set forth and later electrostatically sprayed as in Example 1 for test purposes.

Step I. The materials listed below are thoroughly mixed.

| | A | B | C | D | E |
|---|---|---|---|---|---|
| | | | PARTS BY WEIGHT | | |
| 1. aluminum paste (65% metal) | 30.00 | 30.00 | 30.00 | 30.00 | 30.00 |
| 2. thermoplastic coating material of paragraph (a) Example 1 | 9.75 | 13.65 | 19.5 | 29.25 | 39.00 |
| % based on weight of aluminum | 50.00 | 70.00 | 100.00 | 150.00 | 200.00 |
| 3. poly(lauryl acrylate) | 0.06 | 0.08 | 0.12 | 0.18 | 0.23 |
| 4. methylene chloride | 250.00 | 250.00 | 250.00 | 250.00 | 250.00 |

Step II. This mixture is then spray dried as in the preceding examples and a product comprising aluminum flakes encapsulated in a thermoplastic coating is obtained wherein the relative weights of the components are as follows:

| | A | B | C | D | E |
|---|---|---|---|---|---|
| | | | PARTS BY WEIGHT | | |
| 1. aluminum flakes | 19.5 | 19.5 | 19.5 | 19.5 | 19.5 |
| 2. thermoplastic coating material from Step I | 9.75 | 13.65 | 19.50 | 29.25 | 39.00 |
| 3. poly(laurylacrylate) | 0.06 | 0.08 | 0.12 | 0.18 | 0.23 |

Step III. These encapsulated aluminum flakes are sieved through a 44 micron screen. All particles left on the screen are rejected.

Step IV. A non-metallic powder mixture is made up by thoroughly mixing the below listed materials after which the mixture is pulverized and sieved through a 75 micron screen. All particles left on the screen are rejected.

| | A | B | C | D | E |
|---|---|---|---|---|---|
| | | | PARTS BY WEIGHT | | |
| 1. Resin* | 166 | 166 | 166 | 166 | 166 |
| 2. Azelaic acid | 22.64 | 22.64 | 22.64 | 22.64 | 22.64 |
| 3. Poly(lauryl acrylate) | 1.34 | 1.34 | 1.34 | 1.34 | 1.34 |
| 4. Pigments | | | | | |
| (a) thalo green | 2.03 | 2.03 | 2.04 | 2.06 | 2.08 |
| (b) yellow iron oxide | 8.04 | 8.07 | 8.11 | 8.18 | 8.25 |

Step V. An evenly mixed blend is formed from the encapsulated aluminum flakes of Step III and the non-metallic powder mixture of Step IV in the following relative proportions:

| Ingredient | Parts by Weight |
|---|---|
| aluminum | 1.50 |
| film-former | 93.57 |
| phthalo green | 0.99 |
| yellow iron oxide | 3.93 |

The relative concentrations of ingredients in each of these blends is as follows:

| | A | B | C | D | E |
|---|---|---|---|---|---|
| | | | PARTS BY WEIGHT | | |
| 1. encapsulated aluminum flakes | 2.255 | 2.556 | 3.009 | 3.764 | 4.518 |
| 2. nonmetallic powder | 97.745 | 97.444 | 96.991 | 96.236 | 95.482 |

The powders thus obtained are sprayed on electrically grounded substrates and baked as in Example 1. Aluminum pigment spacing and orientation is best when the resin encapsulation on the aluminum flakes is in the range of 50 to 70 weight percent of the aluminum with the very best achieved with paint A (50 weight percent encapsulation based on the weight of aluminum flakes).

EXAMPLE 40

Aluminum flakes are encapsulated as in Example 1 except for the differences that solvents other than methylene chloride, i.e., toluene, xylene, acetone, hexane and methyl ethyl ketone, are used to disperse the film-forming material and aluminum flakes prior to spray drying. The spray drying operation is adjusted in conformance with the relative volalities of the solvent used in each test. The encapsulated flakes thus prepared are incorporated into the powder paint of Example 1, electrostatically sprayed upon substrates and the substrates are baked as in Example 1.

Hydrocarbons, alcohols and ketones boiling in the range of 50°C. to 152°C., preferably 50°C. to 90°C., can be used for this purpose. The amount of solvent used is in excess of the combined weights of the aluminum flakes and the film-former used for encapsulation.

Advantageously, the amount of solvent used is in the range of about 3 to 100 times the combined weights of film-former and aluminum flakes.

Apparatus and methods for electrostatically spraying powder coating materials are illustrated and described in U.S. Pat. Nos. 3,536,514; 3,593,678; and 3,598,629.

The term "copolymer" is used herein to mean a polymer formed from two or more different monomers.

Many modifications of the foregoing examples will be apparent to those skilled in the art in view of this specification. It is intended that all such modifications which fall within the scope of this invention be included within the appended claims.

The disclosures of U.S. patent application Ser. No. 442,291 filed Feb. 12, 1974 by Santokh S. Labana et al and entitled "Powder Coating Compositions Including Glycidyl Ester-Modified Copolymer" are incorporated herein by reference.

Any and all disclosures appearing in the claims and not specifically appearing in the body of this specification are herewith incorporated in the body of this specification.

We claim:

1. In a powder paint which exclusive of catalysts, antistatic agents, plasticizers, and flow control agent, the same being known and optional additives to powder paints, consists essentially of aluminum flakes, non-metal pigment, and a particulate, organic, film-former, the improvement wherein
  A. non-metal pigment comprises 0 to about 22 weight percent of said powder paint,
  B. said aluminum flakes comprise about 0.005 to about 25 weight percent of said powder paint and are encapsulated prior to admixture with said particulate, organic, film-former with about 2 to about 200 parts by weight of a continuous coating of a thermoplastic, organic film-former per 100 parts by weight aluminum flakes, said thermoplastic, organic, film-former consisting essentially of thermoplastic, organic, film-formers selected from the group consisting of
    1 polymers of alpha-beta olefinically unsaturated monomers of which about 51 to about 100 weight percent are acrylic monomers and 0 to about 49 weight percent are monovinyl hydrocarbons,
    2 polyamides,
    3 polyesters,
    4 homopolymers of monovinyl hydrocarbons,
    5 cellulose acetate, and
    6 cellulose butyrate, and
  C. said particulate, organic film-former is selected from the group consisting of
    1 a thermoplastic, particulate, film-former that is a copolymer of alpha-beta olefinically unsaturated monomers of which about 51 to about 100 weight percent are acrylic monomers and 0 to about 49 weight percent are $C_8 - C_{12}$ monovinyl hydrocarbons, and
    2 a thermosettable, particulate, film-former consisting essentially of a copolymer having average molecular weight ($M_n$) in the range of about 1500 to about 15,000 and glass transition temperature in the range of about 40°C. to about 90°C. bearing functional groups provided by constituent monomers selected from the group consisting of glycidyl esters of a monoethylenically unsaturated carboxylic acid, $C_5 - C_7$ monohydroxy acrylates, $C_5 - C_7$ monohydroxy methacrylates and alpha-beta olefinically unsaturated amides and wherein at least above 50 weight percent of the constituent monomers are acrylic monomers and the remainder weight percent, if any, consists essentially of $C_8 - C_{12}$ monovinyl hydrocarbons, said copolymer being self-crosslinkable or employed with a monomeric or polymeric crosslinking agent.

2. A powder paint in accordance with claim 1 wherein said aluminum flakes are encapsulated by dispersing 100 parts by weight of said aluminum flakes and about 10 to about 200 parts by weight of said thermoplastic, organic, film-former in a volatile solvent boiling in the range of about 40°C to about 152°C that is fugitive from said thermoplastic, organic, film-former and said aluminum flakes in spray drying and spray drying said dispersion, said solvent being present in said dispersion in an amount in excess of the total amount of said aluminum flakes and said film-former.

3. A powder paint in accordance with claim 1 wherein said 100 parts by weight of said aluminum flakes is dispersed in said solvent with 30 to 70 parts by weight of said thermoplastic, organic, film-former, said solvent is selected from methylene chloride and alcohols, ketones and hydrocarbons boiling in the range of about 50°C to about 90°C, and said solvent is present in said dispersion in an amount at least 3 times the combined amounts of said aluminum flakes and said film-former.

4. A powder paint in accordance with claim 1 wherein said encapsulation of said aluminum flakes is in the amount of about 30 to about 70 parts by weight of said thermosettable, organic film-former per 100 parts by weight of said aluminum flakes.

5. A powder paint in accordance with claim 1 wherein said encapsulation of said aluminum flakes is in the amount of about 2 to about 30 parts by weight of said thermoplastic organic film-former per 100 parts by weight of said aluminum flakes.

6. A powder paint in accordance with claim 1 wherein said particulate, organic, film-former is thermosettable and said copolymer of said thermosettable, particulate, film-former is a copolymer of about 5 to about 20 weight percent of a glycidyl ester of a monoethylenically unsaturated carboxylic acid, about 2 to about 10 weight percent of a hydroxy acrylate or methacrylate, and 70 to about 93 weight percent of esters of a $C_1 - C_8$ monohydric alcohol and acrylic or methacrylic acid.

7. A powder paint in accordance with claim 1 wherein said particulate, organic, film-former is thermosettable and said copolymer of said thermosettable, particulate, organic, film-former is a copolymer of about 5 to about 20 weight percent of a glycidyl ester of a monoethylenically unsaturated carboxylic acid, about 2 to about 10 weight percent of an alpha-beta olefinically unsaturated amide, and 70 to about 93 percent of esters of a $C_1 - C_8$ monohydric alcohol and acrylic or methacrylic acid.

8. A powder paint in accordance with claim 1 wherein said thermoplastic, particulate, film-former is a copolymer of alpha-beta olefinically unsaturated monomers of which about 5 to about 100 weight percent are acrylic monomers and 0 to about 49 weight percent are $C_8 - C_{12}$ monovinyl hydrocarbons, has average molecular weight in the range of about 30,000 to about 80,000 and a glass transition temperature in the range of about 60°C. to about 110°C.

9. A powder paint in accordance with claim 1 wherein said particulate, organic, film-former consists essentially of a copolymer of a monoethylenically unsaturated carboxylic acid, about 2 to about 10 weight percent of acrylamide or methacrylamide and about 70 to about 93 weight percent of esters of a $C_1 - C_8$ monohydric alcohol and acrylic or methacrylic acid and a cross-linking agent selected from the group consisting of dicarboxylic acids and anhydrides of dicarboxylic acids.

10. A powder paint in accordance with claim 1 wherein said particulate, organic, film-former consists essentially of a copolymer of about 5 to about 20 weight percent of a glycidyl ester of a monoethylenically unsaturated carboxylic acid and about 80 to about 95 weight percent of esters of a $C_1 - C_8$ monohydric alcohol and acrylic or methacrylic acid and a cross-linking agent selected from the group consisting of dicarboxylic acids and anhydrides of dicarboxylic acids.

11. A powder paint in accordance with claim 1 wherein said particulate, organic, film-former consists essentially of a copolymer of a monoethylenically unsaturated carboxylic acid, about 2 to about 10 weight percent of a $C_5 - C_7$ hydroxy acrylate or methacrylate and about 70 to about 93 weight percent of esters of a $C_1 - C_8$ monohydric alcohol and a crosslinking agent selected from the group consisting of dicarboxylic acids and anhydrides of dicarboxylic acids.

* * * * *